(12) United States Patent
Gutsell et al.

(10) Patent No.: US 11,798,095 B1
(45) Date of Patent: Oct. 24, 2023

(54) COMMERCIAL CLAIM PROCESSING PLATFORM USING MACHINE LEARNING TO GENERATE SHARED ECONOMY INSIGHTS

(71) Applicant: Allstate Insurance Company, Northbrook, IL (US)

(72) Inventors: Christopher Paul Gutsell, Gurnee, IL (US); John P. Kelsh, Antioch, IL (US); Rebecca Harasymczuk, Chicago, IL (US); Matthew Gore, Chicago, IL (US); Nathan Brune, Chicago, IL (US); John Deans, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 48 days.

(21) Appl. No.: 17/215,410

(22) Filed: Mar. 29, 2021

Related U.S. Application Data

(60) Provisional application No. 63/001,851, filed on Mar. 30, 2020.

(51) Int. Cl.
*G06Q 30/00* (2023.01)
*G06Q 40/08* (2012.01)
*G06N 20/00* (2019.01)

(52) U.S. Cl.
CPC ............ *G06Q 40/08* (2013.01); *G06N 20/00* (2019.01)

(58) Field of Classification Search
CPC .. G06N 20/00; G06Q 20/4016; G06Q 50/186; G06Q 20/20; G06Q 20/108
USPC ............ 705/4, 35, 40, 2, 314; 340/539, 628; 706/25
See application file for complete search history.

(56) References Cited

U.S. PATENT DOCUMENTS

| | | |
|---|---|---|
| 7,324,951 B2 | 1/2008 | Renwick et al. |
| 7,610,210 B2 | 10/2009 | Helitzer et al. |
| 7,809,587 B2 | 10/2010 | Dorai et al. |
| 7,953,615 B2 | 5/2011 | Aquila et al. |
| 8,756,085 B1 | 6/2014 | Plummer et al. |
| 9,721,264 B2 | 8/2017 | Labrie et al. |
| 9,721,302 B2 | 8/2017 | Tofte et al. |

(Continued)

OTHER PUBLICATIONS

ProQuestDialogNPL Search History.*

(Continued)

*Primary Examiner* — John H. Holly
(74) *Attorney, Agent, or Firm* — Foley & Lardner LLP

(57) ABSTRACT

Aspects of the disclosure relate to using machine learning methods to produce commercial and shared economy insights. A computing platform may receive historical claim processing information. The computing platform may train a machine learning model using the historical claim processing information, which may configure the machine learning model to output new claim processing information based on claim information. The computer platform may receive a new claim, including claim information, and may process the new claim using the machine learning model, which may result in the new claim processing information. The computing platform may send, to a user computing device, the new claim processing information and one or more commands directing the user computing device to display the new claim processing information, which may cause the user computing device to display the new claim processing information.

20 Claims, 10 Drawing Sheets

(56) References Cited

U.S. PATENT DOCUMENTS

| | | |
|---|---|---|
| 9,824,453 B1 | 11/2017 | Collins et al. |
| 10,102,586 B1 | 10/2018 | Marlow et al. |
| 10,223,753 B1 | 3/2019 | Marlow et al. |
| 10,279,804 B2 | 5/2019 | Pal et al. |
| 10,304,142 B1 | 5/2019 | Davis et al. |
| 10,332,209 B1 | 6/2019 | Brandmaier et al. |
| 10,515,419 B1 | 12/2019 | Walker et al. |
| 10,529,028 B1 | 1/2020 | Davis et al. |
| 2009/0265193 A1 | 10/2009 | Collins et al. |
| 2017/0147991 A1 | 5/2017 | Franke et al. |
| 2018/0260793 A1 | 9/2018 | Li et al. |
| 2019/0019133 A1 | 1/2019 | Allen |
| 2019/0096001 A1 | 3/2019 | Kamrava |
| 2021/0049384 A1* | 2/2021 | Morrow .................. G06Q 40/08 |
| 2021/0287297 A1* | 9/2021 | Hayward ................ G10L 15/26 |

OTHER PUBLICATIONS

Rukshala Weerasinghe et al. "Image Processing Based Severity and Cost Prediction of Damages in the Vehicle Body: A Computational Intelligence Approach" ResearchGate http://dlib.iit.ac.lk/xmlui/handle/123456789/9 Sep. 2017, pp. 1-5.

Lili Kan "From Self-Driving Cars to Optimizing Claims Efficiency: My Unconventional Journey to Insurance Engineering" Uber Engineering https://eng.uber.com/insurance-engineering/ Jan. 4, 2019, pp. 1-5.

John Matley et al. "Insuring the future of mobility: The insurance industry's role in the evolving transportation ecosytem" Deloitte https://www2.deloitte.com/us/en/insights/focus/future-of-mobility/mobility-ecosystem-future-of-auto-insurance.html May 13, 2016, pp. 1-28.

"Machine learning" Wikipedia website: https://en.wikipedia.org/wiki/Machine_learning website visited on Mar. 16, 2021, pp. 1-24.

\* cited by examiner

405

Claim Processing Interface

Based on the information you provided, we have automatically processed your claim, resulting in a settlement of $500.

Would you like us to proceed with payment?

| Yes | No |

Would you like us to dispatch a repair service?

| Yes | No |

Claim Insight Interface

Based on the information you provided, we have estimated the damage to your vehicle is $3,000.

Would you like to file a claim?

| Yes | No |

FIG. 5

COMMERCIAL CLAIM PROCESSING PLATFORM USING MACHINE LEARNING TO GENERATE SHARED ECONOMY INSIGHTS

CROSS-REFERENCE TO RELATED APPLICATIONS

The present application claims priority to U.S. Provisional Application No. 63/001,851 filed on Mar. 30, 2020, and entitled "Commercial Claim Processing Platform Using Machine Learning to Generate Shared Economy Insights," which is hereby incorporated by reference as to its entirety.

BACKGROUND

Aspects of the disclosure relate to enhanced processing systems for executing machine learning algorithms and providing insights for commercial and/or shared economy services. Many organizations and/or individuals make claims related to commercial incidents (e.g., relating to work, employees, or the like). In some instances, however, these claims might not be optimally processed for organizations providing commercial and/or shared economy services, which may result in excessive expenditure of resources for both shared economy organizations and others.

SUMMARY

Aspects of the disclosure provide effective, efficient, scalable, and convenient technical solutions that address and overcome the technical problems associated with generation of commercial and shared economy insights.

In accordance with one or more embodiments, a computing platform comprising at least one processor, a communication interface communicatively coupled to the at least one processor, and memory may receive historical claim processing information. The computing platform may train a machine learning model using the historical claim processing information, which may configure the machine learning model to output new claim processing information based on claim information. The computing platform may receive a new claim, including claim information. Using the machine learning model, the computing platform may process the new claim, which may result in the new claim processing information. The computing platform may send, to a user computing device, the new claim processing information and one or more commands directing the user computing device to display the new claim processing information, which may cause the user computing device to display the new claim processing information.

In one or more instances, the historical claim processing information may include one or more of: one or more images, one or more videos, damage assessment information, fault information, settlement amounts, telematics data, and/or other information. In one or more instances, the computing platform may compare the new claim processing information to a predetermined confidence threshold. Based on identifying that the new claim processing information exceeds the predetermined confidence threshold, the computing platform may send the new claim processing information to the user computing device without manual review. Based on identifying that the new claim processing information does not exceed the predetermined confidence threshold, the computing platform may send the new claim processing information for manual review.

In one or more examples, the computing platform may generate, while processing the new claim, claim status information indicating a status of processing the new claim. The computing platform may receive a request for a status update for processing of the new claim. In response to the request for the status update, the computing platform may send the claim status information, which may cause the claim status information to be displayed at a remote computing device.

In one or more instances, sending, to the user computing device, the new claim processing information and one or more commands directing the user computing device to display the new claim processing information may include sending, via an enterprise computing system, the new claim processing information and the one or more commands directing the user computing device to display the new claim processing information. In these instances, the enterprise computing system may be configured to render the new claim processing information for display.

In one or more arrangements, the computing platform may receive, from the user computing device, confirmation information. In response to receiving the confirmation information, the computing platform may perform one of more of: 1) sending one or more commands directing an event processing system to execute a payment corresponding to the new claim, which may cause the event processing system to execute the payment, or 2) sending one or more commands directing a third party service device to cause dispatch of a service vehicle based on the new claim information, which may cause dispatch of the service vehicle.

In one or more instances, the computing platform may receive, prior to receiving the new claim, a query from the user computing device. Using one or more sub-processes of the machine learning model, the computing platform may identify a response to the query. The computing platform may send, to the user computing device, the response to the query, which may cause the user computing device to display the response to the query.

In one or more examples, the query may be a request for a damage assessment in a shared-economy scenario, and the shared-economy scenario may be one or more of: a ride share scenario, a vehicle share scenario, or a home sharing scenario. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4 and 5 depict illustrative graphical user interfaces for applying machine learning for claim processing and/or insight generation in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief summary, the description herein provides systems and methods for a commercial claims as a service platform that brings together systems, services, and software to perform and make available claim servicing capabilities from loss notification through resolution. In some instances, a fully digital straight-through experience may be created using technology, experts and interactions, business processing (e.g., decisions, services, or the like), or the like. This may allow for a full solution for rapid customer onboarding once they purchase "shared economy" insurance. Furthermore, additional value add services may be integrated and brought together within the platform (e.g., new insight services, video inspections, photo estimations, or the like). This may result in reduced operational costs, while delivering a high value experience with faster and more consistent claim outcomes.

For example, current claim applications might not readily support the new kinds of commercial customers that are buying insurance policies for shared economies (e.g., car share services, ride share services, home share services, asset share services, or the like). Customers of these services may demand new levels of digital integration and digital interaction for users of their platform. Accordingly, platforms for such claim processing should provide clients and customers controlled access to claim information, which may allow customizable experiences (e.g., through views provided by insurance institutions, customer platforms, and/or other enterprise organizations). Accordingly, one or more of the systems and methods described herein may be critical value drivers, allowing growth through new customer acquisition through claim processing, automated decision making, and/or self-service. Furthermore, one or more of the systems and methods described herein may allow decomposition of the claim process into services for customers that may want to leverage sub-processes and decisions (e.g., liability determinations, estimating damage cost from photos/video, or the like).

Figure 1A:
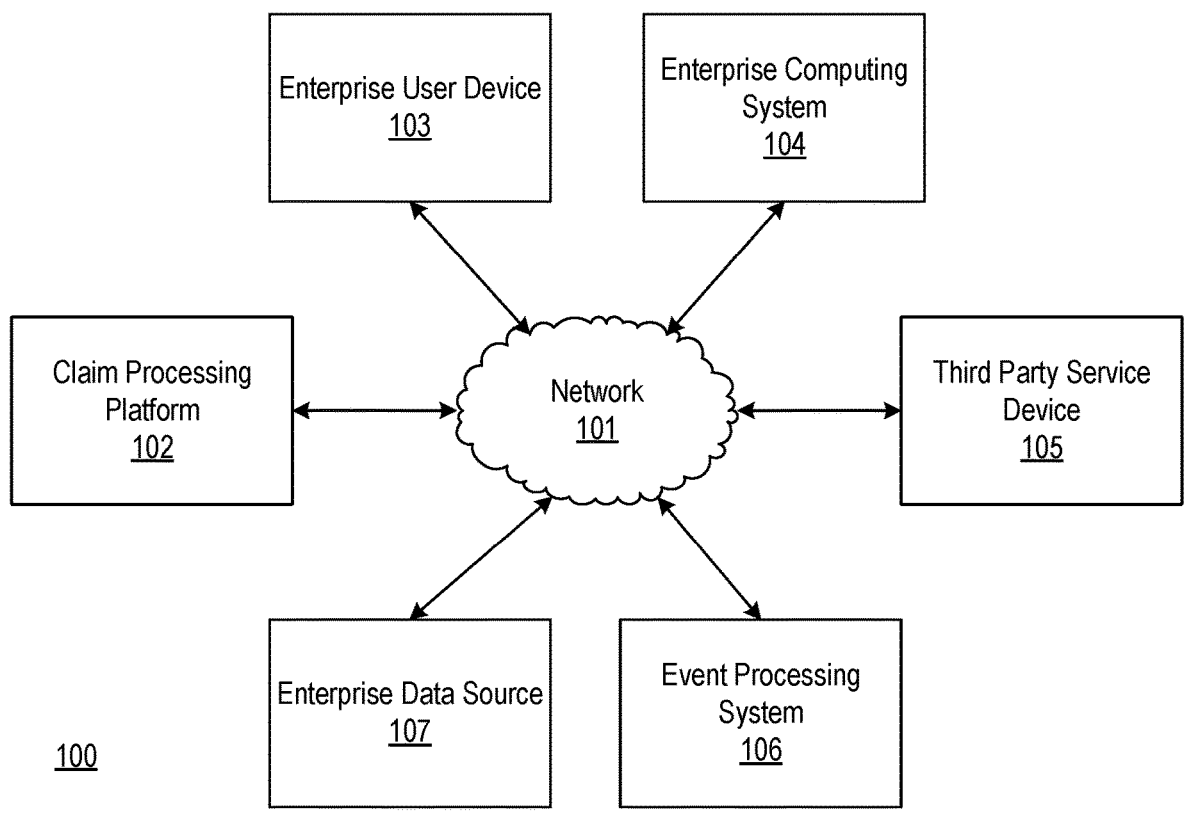
FIGS. 1A and 1B depict an illustrative computing environment for applying machine learning for claim processing and shared economy insight generation in accordance with one or more example embodiments.
Figure 1B:
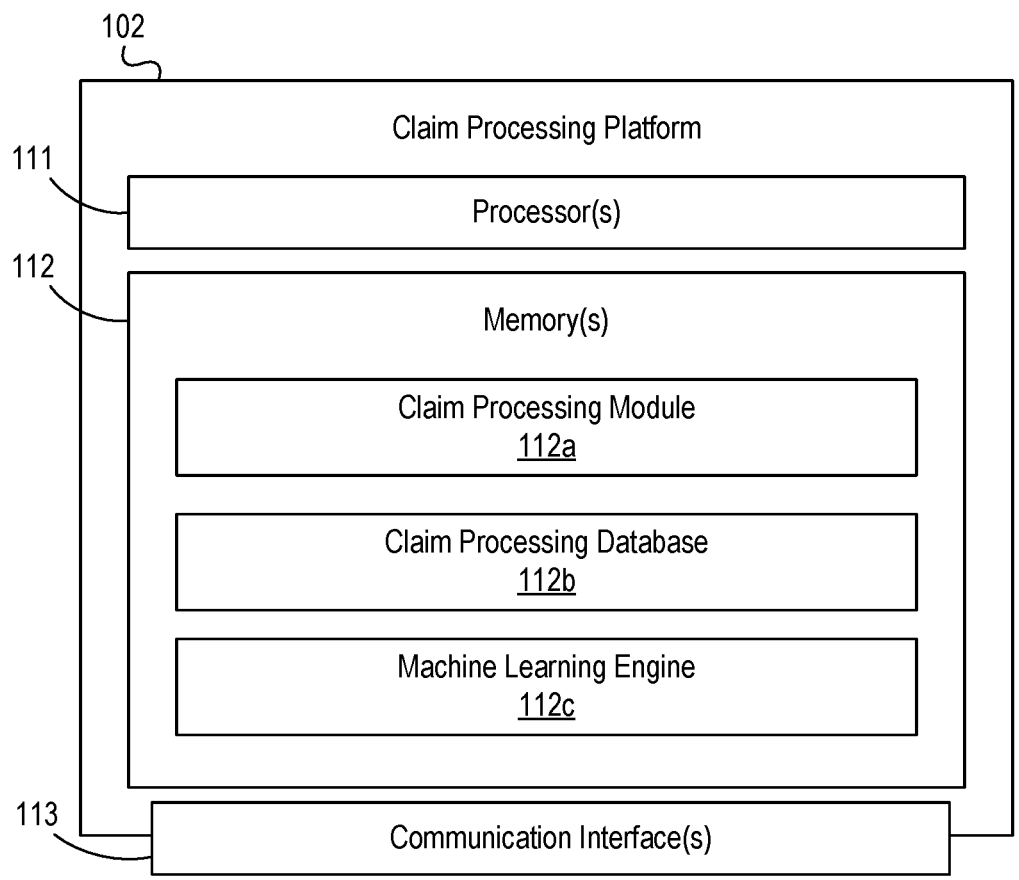

FIGS. 1A and 1B depict an illustrative computing environment for applying machine learning to select and leverage sub-processes within an end-to-end claim processing process to provide shared economy insights in accordance with one or more example embodiments. Referring to FIG. 1A, computing environment 100 may include one or more computer systems. For example, computing environment 100 may include claim processing platform 102, enterprise user device 103, enterprise computing system 104, third party service device 105, event processing system 106, and enterprise data source 107.

As illustrated in greater detail below, claim processing platform 102 may include one or more computing devices configured to perform one or more of the functions described herein. For example, claim processing platform 102 may include one or more computers (e.g., servers, server blades, desktop computers, laptop computers, mobile devices, tablets, or the like). In one or more instances, claim processing platform 102 may be configured to maintain various sub-processes within an end-to-end claim processing process. In these instances, the claim processing platform 102 may leverage machine learning to select one or more sub-processes, and may execute the selected sub-processes to provide insights (e.g., information, which may be a response to a query, delivered as a message, or in another format) related to shared economy and/or commercial services. Additionally or alternatively, the claim processing platform 102 may be configured to use the various sub-processes to automatically process a claim without further manual intervention, and, in some instances, to provide status information indicating progress of processing the claim.

Enterprise user device 103 may be a computing device (e.g., a smart phone, a tablet, laptop, desktop computer, or the like) that may be used by, for example, an employee, independent contractor, or the like of a shared economy enterprise organization such as a ride share, home share, vehicle share, asset share, or the like organization (e.g., a field worker of the organization). In some instances, the enterprise user device 103 may be used by the employee to perform shared economy services related to the enterprise organization, report claims, or the like. Additionally or alternatively, the enterprise user device 103 may be used by an employee of a commercial enterprise organization (e.g., an organization that is not necessarily a shared economy organization). In one or more instances, the first enterprise user device 103 may be a computing device configured to generate/display graphical user interfaces (which may include, e.g., shared economy interfaces, commercial interfaces, claim processing interfaces, or the like) accordingly.

Enterprise computing system 104 may be a computing device (e.g., a server, a server blade, a smart phone, a tablet, laptop, desktop computer, or the like) that may be affiliated with the shared economy/commercial enterprise organization that is affiliated with the enterprise user device 103. For example, the enterprise computing system 104 may be configured to communicate with the claim processing platform 102, and to format or otherwise configure data/information, received from the claim processing platform 102, for display at the enterprise user device 103.

Third party service device 105 may be one or more computing devices (e.g., laptop computers, desktop computers, servers, server blades, or the like) that may be used (e.g., by an employee of a third party service such as a repair service, maintenance service, or the like) to schedule and perform various tasks (e.g., home repair, vehicle repair, or the like). In one or more instances, the third party service device 105 may be a computing device configured to generate/display graphical user interfaces (which may include, e.g., dispatch instructions, diagnostic information, repair/maintenance schedules, shared economy insight interfaces, commercial economy insight interfaces, or the like) accordingly.

Event processing system 106 may be one or more computing devices (e.g., laptop computers, desktop computers, servers, server blades, or the like) that may correspond or otherwise be affiliated with a financial institution. For example, the event processing system 106 may be configured to receive event processing requests (e.g., a request to process a payment, transfer funds, or the like associated with a claim), and to process the events (e.g., process payment, transfer funds, or the like associated with a claim) accordingly.

Enterprise data source 107 may be one or more computing devices (servers, server blades, or the like) that are configured to store data/information that may be used to train, update, and/or refine the machine learning model(s) hosted by the claim processing platform 102. For example, the enterprise data source 107 may store or otherwise maintain images, videos, damage assessment information, fault information, settlement amounts, telematics data, and/or other information associated with historical claims.

Computing environment 100 also may include one or more networks, which may interconnect one or more of claim processing platform 102, enterprise user device 103, enterprise computing system 104, third party service device 105, event processing system 106, enterprise data source, or the like. For example, computing environment 100 may include a network 101 (which may, e.g., interconnect claim processing platform 102, enterprise user device 103, enterprise computing system 104, third party service device 105, event processing system 106, enterprise data source 107, or the like).

In one or more arrangements, claim processing platform 102, enterprise user device 103, enterprise computing system 104, third party service device 105, event processing system 106, enterprise data source 107, and/or the other systems included in computing environment 100 may be any type of computing device capable of and configured for receiving a user interface, receiving input using the user interface, and communicating the received input to one or more other computing devices. For example, claim processing platform 102, enterprise user device 103, enterprise computing system 104, third party service device 105, event processing system 106, enterprise data source 107, and/or the other systems included in computing environment 100 may, in some instances, be and/or include server computers, desktop computers, laptop computers, tablet computers, smart phones, sensors, or the like that may include one or more processors, memories, communication interfaces, storage devices, and/or other components. As noted above, and as illustrated in greater detail below, any and/or all of claim processing platform 102, enterprise user device 103, enterprise computing system 104, third party service device 105, event processing system 106, and/or enterprise data source 107 may, in some instances, be special-purpose computing devices configured to perform specific functions.

Referring to FIG. 1B, claim processing platform 102 may include one or more processors 111, memory 112, and communication interface 113. A data bus may interconnect processor 111, memory 112, and communication interface 113. Communication interface 113 may be a network interface configured to support communication between claim processing platform 102 and one or more networks (e.g., network 101, or the like). Memory 112 may include one or more program modules having instructions that when executed by processor 111 cause claim processing platform 102 to perform one or more functions described herein and/or one or more databases that may store and/or otherwise maintain information which may be used by such program modules and/or processor 111. In some instances, the one or more program modules and/or databases may be stored by and/or maintained in different memory units of claim processing platform 102 and/or by different computing devices that may form and/or otherwise make up claim processing platform 102. For example, memory 112 may have, store, and/or include claim processing module 112a, claim processing database 112b, and a machine learning engine 112c. Claim processing module 112a may have instructions that direct and/or cause claim processing platform 102 to execute advanced machine learning techniques for selecting and leveraging sub-processes within an end-to-end claim processing process to provide shared economy/commercial insights and/or perform automated claim processing, as discussed in greater detail below. Claim processing database 112b may store information used by claim processing module 112a and/or claim processing platform 102 in storing sub-processes and other data that may be used to provide shared economy/commercial insights, process claims, and/or in performing other functions. Machine learning engine 112c may have instructions that direct and/or cause the claim processing platform 102 to provide shared economy/commercial insights, process claims, and to set, define, and/or iteratively refine optimization rules and/or other parameters used by the claim processing platform 102 and/or other systems in computing environment 100. For example, the machine learning engine 112c may apply one or more machine learning algorithms (e.g., supervised learning algorithms, unsupervised learning algorithms, reinforcement learning algorithms, self learning algorithms, feature learning algorithms, sparse dictionary learning algorithms, anomaly detection algorithms, association rules, or the like) and/or one or more machine learning models (e.g., artificial neural networks, decision trees, support vector machines, regression analysis, Bayesian networks, generic algorithms, or the like).

Figure 2A:
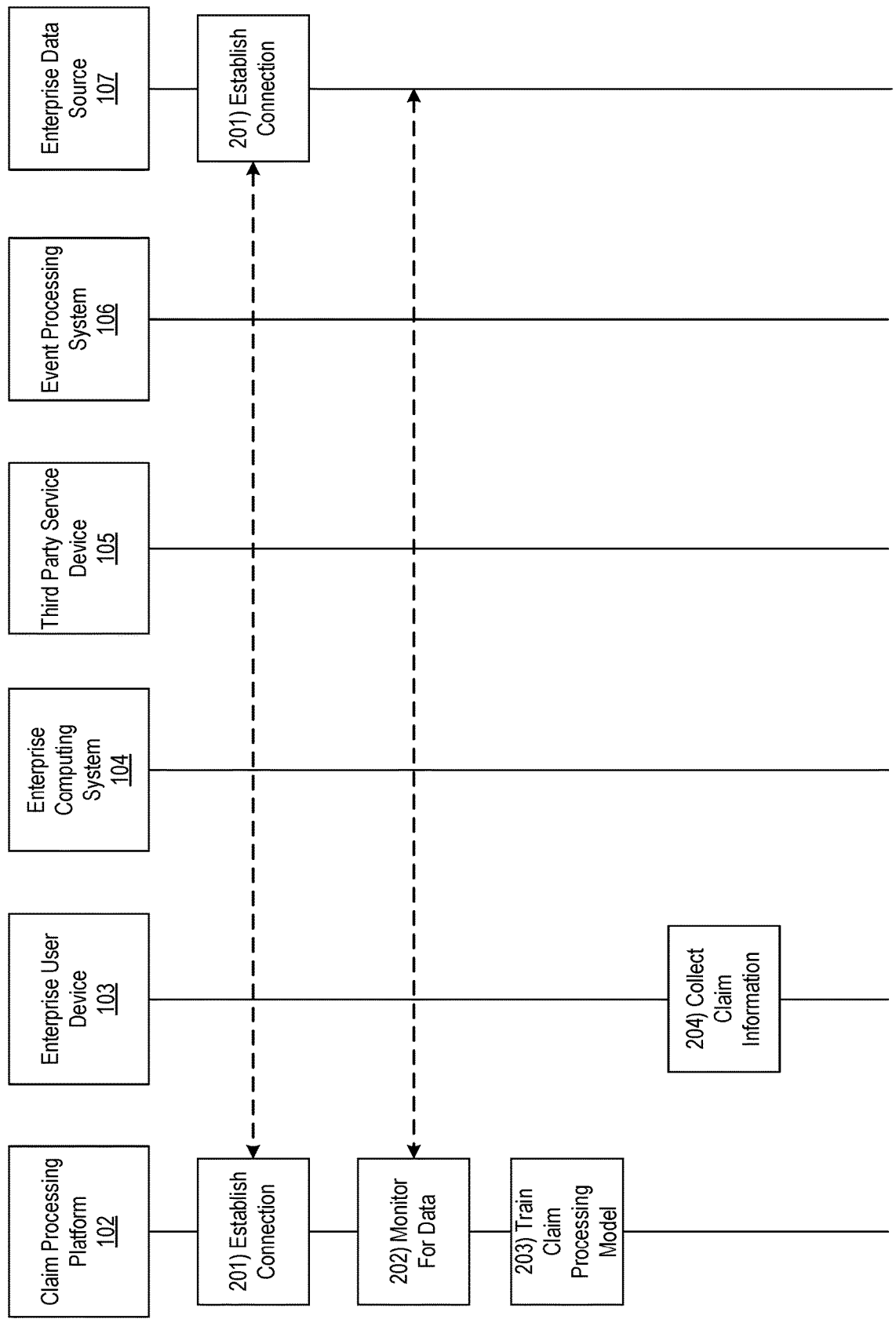
FIGS. 2A-2F depict an illustrative event sequence for applying machine learning for claim processing and shared economy insight generation in accordance with one or more example embodiments.

FIGS. 2A-2F depict an illustrative event sequence for applying machine learning for claim processing and/or insight generation in accordance with one or more example embodiments. Referring to FIG. 2A, at step 201, the claim processing platform 102 may establish a connection with the enterprise data source 107. For example, the claim processing platform 102 may establish a first wireless data connection with the enterprise data source 107 to link the claim processing platform to the enterprise data source 107 (e.g., in preparation for monitoring for/collecting historical claim data). In some instances, the claim processing platform 102 may identify whether or not a connection is already established with the enterprise data source 107. If a connection is already established with the enterprise data source 107, the claim processing platform 102 might not re-establish the connection. If a connection is not yet established with the enterprise data source 107, the claim processing platform 102 may establish the first wireless data connection as described herein.

At step 202, the claim processing platform 102 may monitor the enterprise data source 107 for data (e.g., images, videos, damage assessment information, fault information, settlement amounts, telematics data, and/or other information associated with historical claims). In some instances, the claim processing platform 102 may collect data corresponding to a plurality of different individuals. In some instances, the claim processing platform 102 may monitor for data while the first wireless data connection is established, and may subsequently receive the data via the communication interface 113.

At step 203, the claim processing platform 102 may train a claim processing model, using the data received at step 202. For example, the claim processing platform 102 may train the claim processing model to process a claim (e.g., a commercial claim, shared economy claim, and/or other claim) without involving an agent, adjuster, and/or other employee of a claim processing entity. More specifically, the claim processing platform 102 may train the claim processing model to identify similarities between new claim information received and established datasets to make automated decisions. For example, the claim processing platform 102 may train the claim processing model to make damage assessments, fault determinations, and/or other automated decisions by leveraging stored claim processing information.

Additionally or alternatively, in training the claim processing model, the claim processing platform 102 may train the model to identify and subsequently leverage sub-processes (e.g., of the model) based on a received query related to shared economy service, commercial service, and/or other services. In these instances, the claim processing platform 102 may train the machine learning model to identify sub-processes relevant to a query (which may be received independently of a request for claim processing), and may execute these sub-processes to provide insight information (e.g., information that responds to the query, and may ultimately displayed to an individual). For example, the claim processing platform 102 may be able to identify and leverage sub-processes, used to process claims, to respond to queries (e.g., without necessarily engaging every sub-process of an end to end claim processing service and/or without necessarily receiving a claim). As a particular example, the claim processing platform 102 may train the claim processing model to provide damage assessment information, fault assessment information, and/or other information even in the absence of receiving a request to process a claim (e.g., an individual may simply want to gain information without filing a claim).

At step 204, the enterprise user device 103 (and/or other sensors corresponding to a user of the enterprise user device 103 such as telematics sensors, cameras, and/or other sensors) may collect claim information. For example, the enterprise user device 103 may collect images, videos, telematics data, and/or other information that may be used to assess damage and/or fault. More specifically, the enterprise user device 103 may collect claim information in one or more shared economy contexts (e.g., rideshare, vehicle share, home share, or the like) and/or commercial contexts (e.g., an employee of a standard, non-shared economy, enterprise).

Figure 2B:
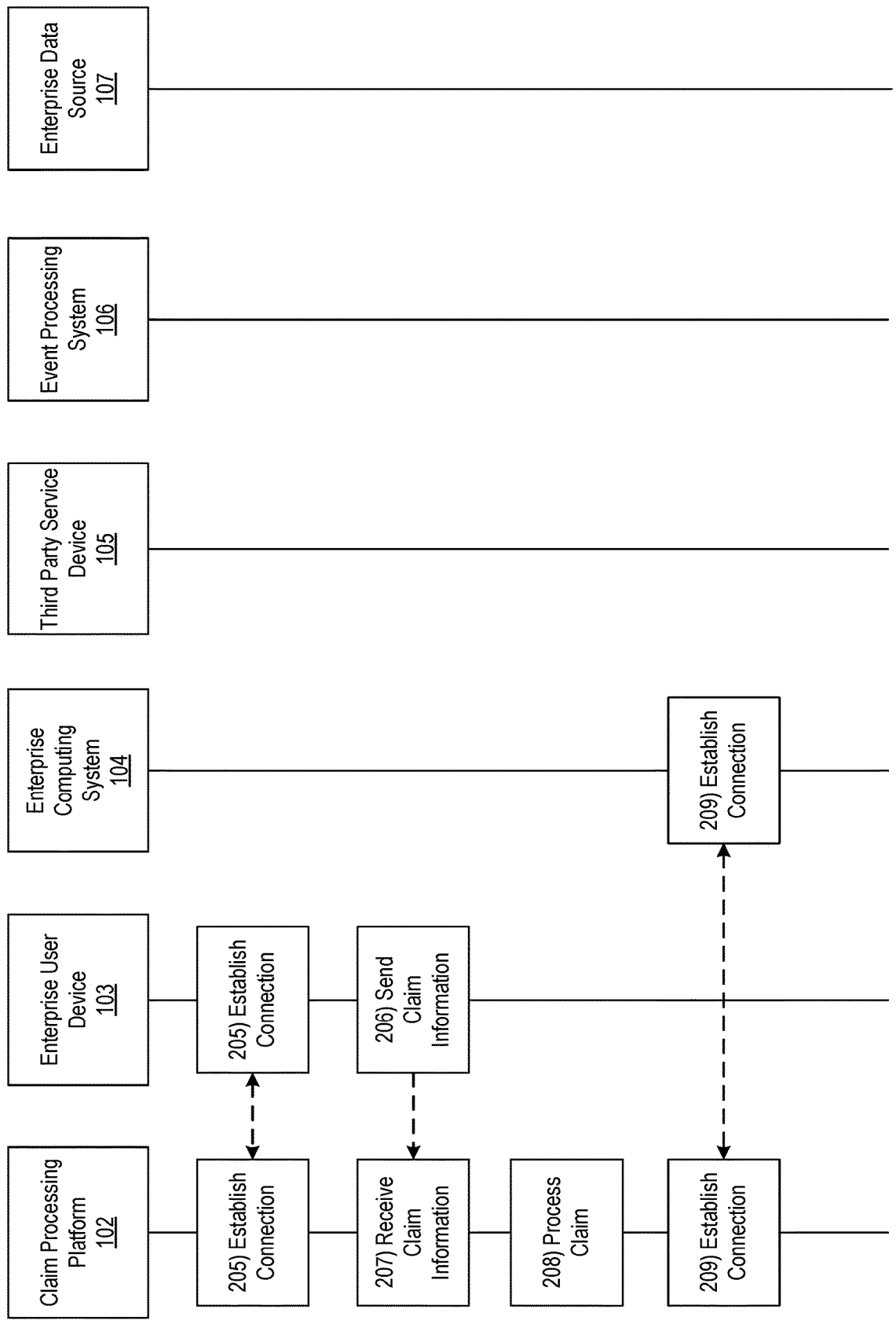

Referring to FIG. 2B, at step 205, the enterprise user device 103 may establish a connection with the claim processing platform 102. For example, the enterprise user device 103 may establish a second wireless data connection with the claim processing platform 102 to link the enterprise user device 103 to the claim processing platform 102 (e.g., in preparation for sending the claim information). In some instances, the enterprise user device 103 may identify whether or not a connection is already established with the claim processing platform 102. If a connection is already established, the enterprise user device 103 might not re-establish the connection. If a connection is not yet established, the enterprise user device 103 may establish the second wireless data connection as described herein.

At step 206, the enterprise user device 103 may send the claim information (collected at step 204) to the claim processing platform 102. In some instances, along with the claim information, the enterprise user device 103 may send a request to process a corresponding claim. For example, the enterprise user device 103 may send the claim information and/or claim processing request to the claim processing platform 102 while the second wireless data connection is established.

At step 207, the claim processing platform 102 may receive the claim information and/or claim processing request from the enterprise user device 103. For example, the enterprise user device 103 may receive the claim information and/or claim processing request via the communication interface and while the second wireless data connection is established.

At step 208, the claim processing platform 102 may process the requested claim. For example, the claim processing platform 102 may use the machine learning model, trained at step 203, to compare the claim information to historical claim information and identify a match that exceeds a predetermined matching threshold (e.g., similar damage, similar vehicle type, similar structure type, similar conditions, similar geographic regions, and/or other similar characteristics). The claim processing platform 102 may then use that identified match to determine a settlement amount (e.g., the settlement amount will likely be the same or similar to that of the matching historical claim). For example, in processing the claim, the claim processing platform 102 may process a claim for damage and/or identify fault for a vehicle belonging to a rideshare driver, a claim for damage to a home share property, and/or other claims in either of the commercial and/or shared economy contexts. In processing the claim, the claim processing platform 102 may generate or otherwise output claim response information indicating a result of processing the requested claim.

In some instances, the claim processing platform 102 may identify that the claim information is insufficient to process the claim. In these instances, the claim processing platform 102 may request further claim information from the user computing device 103 and/or contact an enterprise computing device (e.g., corresponding to an insurance adjuster, customer service representative, or the like), and indicate that the individual associated with that enterprise computing device should contact the user of the user computing device 103 to obtain further information.

In some instances, to process the requested claim, the claim processing platform 102 may use the machine learning model to perform one or more steps of a claim processing workflow, such as set claim preferences, pick up new claim, complete file orientation, determine file needs, create claim plan, complete initial claim activity, reassignment, coverage confirmation, fault determination, injury evaluation, physical damage value determination, outcome communication, gather loss detail, gather injury damage detail, gather physical damage detail, evaluate injury/physical damage, settlement assembly, settlement communication, gather additional information, payment issued, and/or other claim processing stages. These steps are described further below.

With regard to claim creation, the claim processing platform 102 may collect loss details from an involved party (e.g., from the user computing device 103) and input them into a client loss notification intake system. The claim processing platform may then generate a notice of loss report, and put the claim into a suspense state until a claim number has been returned (e.g., by an insurance carrier). Once collected, the claim processing system 103 may update the suspended state (e.g., notice of loss report/ticket) with the carrier claim number.

With regard to establishing a new claim, the claim processing platform 102 may identify whether sufficient information has been received to create a claim. To do so, the claim processing platform 102 may monitor for new loss reports, and may store any identified information. In these instances, once all claim detail has been entered into the system, a claim number or other unique identifier may be generated by the claim processing platform 102. If further information is needed to establish the claim, the claim processing platform 102 may communicate with the user computing device 103 to obtain such information.

With regard to picking up a new claim, a claim may be selected from a list of claims. In some instances, this step may be manually performed (e.g., the claim may be assigned to an adjuster, agent, and/or other individual) and in other instances, it may be automated.

With regard to reviewing the claim file, the claim processing platform 102 may analyze the provided claim information and any supporting documents (e.g., using the machine learning model) to identify what happened, when it happened, damage information, and/or other information. The claim processing platform 102 may identify if the claim was provided merely for notification purposes, or rather for processing purposes. Furthermore, the claim processing platform 102 may update the claim information to include any additional details provided in the claim itself (e.g., participant details, assets, injury information, damage information). The claim processing platform 102 may open applicable coverage and/or establish loss reserve levels based on available information, and establish expense level reserves for future payment processing. In some instances, the claim processing platform 102 may identify communications that may be needed throughout the processing of the claim (e.g., acknowledgement letters, status letters, settlement payment confirmation letters, and/or other communications), and may complete such communications using automated templates. In some instances, the claim processing platform 102 may escalate one or more aspects of the claim as necessary (e.g., for manual review by an agent, adjuster, or the like). Based on the claim review, the claim processing platform 102 may open one or more types of coverage for the individual requesting the claim such as liability—property damage combined single limit (e.g., if there is a claim of damage to an asset or property that belongs to someone other than the insured), property in care custody and control (e.g., if there is a claim of damage to an asset or property that was left in the "care," "custody," or "control" of the individual, the property may be alleged to have been in the insured's possession outside of the contracted accommodation), liability bodily injury combined single limit (e.g., if there is a claim of injury to claim participants other than the insured), limited personal injury liability and government regulatory action for friendly building (e.g., if a claim for liability is alleged that results in government fines or action), medical payments (e.g., if there is a claim of injury to claim participants other than the insured), medical evacuation (e.g., if there is a claim for expenses related to medical evacuation or repatriation to claim participants other than an insured), and/or other coverage types.

With regard to claim determinations, the claim processing platform 103 may determine whether enough information has been received to determine coverage and/or fault, enable physical damage estimating, evaluate injury, and/or perform other functions. If sufficient information has been received, the claim processing platform 103 may determine fault, evaluate injury, determine physical damage, and/or perform other functions using the machine learning model.

More specifically, to confirm coverage, the claim processing platform 103 may review policy/loss information (e.g., reservation period, policy effective period, covered loss location, provided coverage types, date of loss, loss location, types of damage, or the like). The claim processing platform 103 may identify that coverage is confirmed if: 1) the loss date occurred within the valid reservation period, 2) the loss location is a covered location per the policy, 3) the policy provides coverage for the loss type presented, and 4) there are no applicable policy exclusions of conditions. If the claim processing platform 103 is unable to confirm coverage, it may escalate the claim for manual review (e.g., by a client, an adjuster, an agent, and/or other individual).

To determine fault (e.g., using the machine learning model), the claim processing platform 102 may review loss fact information (e.g., from the claim information), which may include, for example, statements, official reports, and/or other supporting evidence, to determine if there is sufficient information to understand the facts of the loss and assess fault. In some instances, in assigning fault, the claim processing platform 102 may assign a percentage value (e.g., if it is understood how damage occurred and what caused the damage, and each party's obligations to each other are understood). For example, the claim processing platform 102 may identify faults of the named insured party (e.g., based on duties owed and breached to additional insureds/claimants), additional insured parties (e.g., based on the duties owed and breached to the named insured, claimants, and/or other additional insureds), and/or claimants (e.g., based on the duties owed and breached to named insured and additional insureds). In doing so, the claim processing platform 102 may identify the proximate cause of loss and determine each party's contribution to the loss.

To determine physical damage (e.g., using the machine learning model), the claim processing platform 102 may review physical damage information (e.g., from the claim information) to identify which party has experienced the physical damage and the type of damage experienced (e.g., contents, structure, vehicle, or the like). In some instances, the claim processing platform 102 may compute, using the machine learning model, a damage estimation value. If the damage estimation value exceeds a predetermined threshold, the claim processing platform 102 may route the estimated damage value for manual review/confirmation, and/or may request a further virtual and/or physical damage inspection from the individual making the claim (e.g., a notification may be sent to the user computing device 103).

To evaluate injury (e.g., using the machine learning model), the claim processing platform 102 may identify if enough injury, medical, wage, and/or other information (e.g., included in the claim information) is available to evaluate the injury. If enough information is available, the claim processing platform 102 may use the machine learning model to identify which participant was injured and the nature of the injury. In some instances, the claim processing platform 102 may project corresponding medical bills (and cause a corresponding fund transfer, payment, or the like as described below at steps 223-225).

As necessary, the claim processing platform 102 may communicate with the user computing device 103 to obtain any additional details needed for processing of the claim. For example, the claim processing platform 102 may direct an employee to initiate a voice call with the user of the user computing device 103 and/or an automated message may be sent. In some instances, in communicating with the user computing device 103, the claim processing platform 102 may prompt for video and/or voice fact collection, supporting documents, and/or other information, until sufficient information has been received. In some instances, the claim processing platform 102 may send automated reminders to provide this additional information.

For example, the claim processing platform 102 may request a virtual damage inspection (e.g., using photos, video, video conference call, or the like), physical damage inspection (e.g., in person by a damage adjuster), injury inspection (e.g., video, voice call, video call, in person), and/or other inspection. In some instances, the claim processing platform 102 may request the virtual and/or physical damage inspection to identify physical damage details such as personal property contents, home/building structure, motorized vehicle, motorcycle, and/or other information. In some instances, the claim processing platform 102 may request the injury inspection to identify whether or not an injury is related and/or consistent with a loss, identify the injury, identify treatment, and/or other details.

In some instances, the claim processing platform 102 may collect identified medical and/or wage information for the individual requesting the claim, and compile a database that includes this information.

Once all information has been collected and assessed by the claim processing platform 102, the claim processing platform 102 may resolve the claim using the machine learning model. For example, the claim processing platform 102 may confirm coverage (e.g., if coverage has not been confirmed, claim denial information may be generated), assess fault (e.g., fault may be documented for each involved participant and then liability may be assessed based on state negligence laws), and identify physical/injury damages (e.g., using the machine learning model). In some instances, while processing the requested claim, the claim processing platform 102 may generate claim status information indicating a current status of the requested claim. In these instances, the claim processing platform 102 may make this claim status information accessible to the enterprise user device 103 (e.g., either directly accessible to the enterprise user device 103 or accessible by the enterprise user device 103 via the enterprise computing system 104). For example, the claim processing platform 102 may either format the claim status information for display, or may otherwise share the claim status information with the enterprise computing system 104, which may format the claim status information for display at the enterprise user device 103. As specific examples, the claim processing platform 102 may generate claim status information indicating that the claim is currently in one of the following stages: set claim preferences, pick up new claim, complete file orientation, determine file needs, create claim plan, complete initial claim activity, reassignment, coverage confirmation, fault determination, injury evaluation, physical damage value determination, outcome communication, gather loss detail, gather injury damage detail, gather physical damage detail, evaluate injury/physical damage, settlement assembly, settlement communication, gather additional information, payment issued, and/or other claim processing stages. In some instances, a user may access this claim status information via a portal hosted by the claim processing platform 102 and/or the enterprise computing system 104.

At step 209, the claim processing platform 102 may establish a connection with the enterprise computing system 104. For example, the claim processing platform 102 may establish a third wireless data connection with the enterprise computing system 104 to link the claim processing platform 102 to the enterprise computing system 104 (e.g., in preparation for sending claim response information). In some instances, the claim processing platform 102 may identify whether or not a connection is already established with the enterprise computing system 104. If a connection is already established with the enterprise computing system 104, the claim processing platform 102 might not re-establish the connection. If a connection is not yet established with the enterprise computing system 104, the claim processing platform 102 may establish the third wireless data connection as described herein.

Figure 2C:
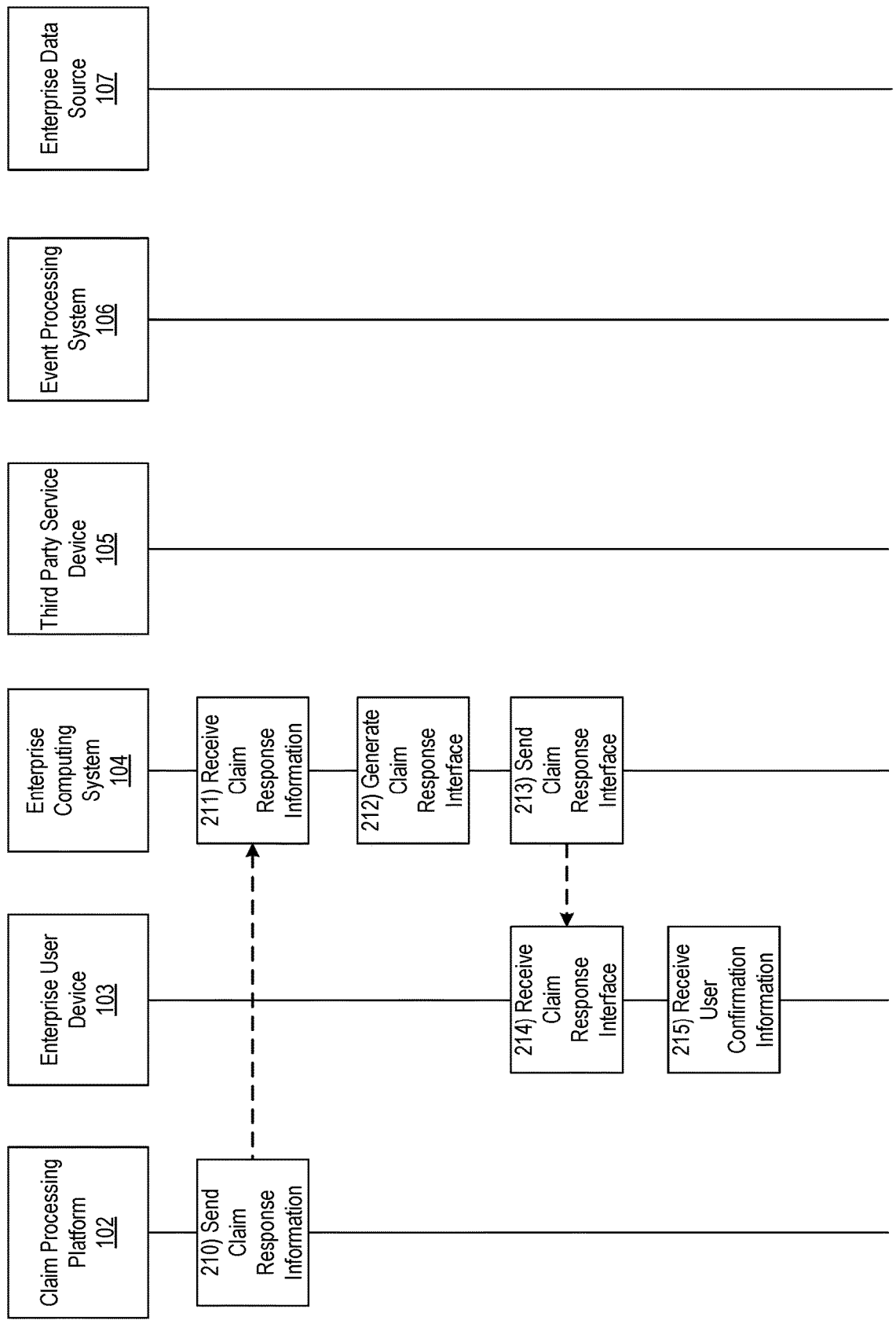

Referring to FIG. 2C, at step 210, the claim processing platform 102 may send the claim response information to the enterprise computing system 104. For example, the claim processing platform 102 may send the claim response information to the enterprise computing system 104 via the communication interface 113 and while the third wireless data connection is established.

At step 211, the enterprise computing system 104 may receive the claim response information sent at step 210. For example, the enterprise computing system 104 may receive the claim response information while the third wireless data connection is established.

At step 212, the enterprise computing system 104 may generate a claim response interface. In some instances, in generating the claim response interface, the enterprise computing system 104 may generate a graphical user interface similar to graphical user interface 405, which is shown in FIG. 4. For example, the enterprise computing system 104 may format the claim response information to generate a graphical user interface indicating a proposed settlement value, and options to confirm next steps.

At step 213, the enterprise computing system 104 may send the claim response interface, generated at step 212, to the enterprise user device 103 for display. For example, a fourth wireless data connection may be established between the enterprise computing system 104 and the enterprise user device 103, and the claim response interface may be sent while the fourth wireless data connection is established.

At step 214, the enterprise user device 103 may receive the claim response interface sent at step 213. For example, the enterprise user device 103 may receive the claim response interface while the fourth wireless data connection is established. Upon receiving the claim response interface, the enterprise user device 103 may display the claim response interface.

In some instances, the claim response interface may be generated instead by the claim processing platform 102, and sent from the claim processing platform 102 to the enterprise user device 103. In these instances, steps 210-214 may be adjusted to reflect interaction between the claim processing platform 102 and the enterprise computing system 104.

At step 215, the enterprise user device 103 may receive user confirmation information (e.g., via the claim response interface displayed at step 214). For example, the enterprise user device 103 may receive user input indicating whether or not an event should be processed (e.g., a service vehicle should be dispatched, a payment should be processed, and/or other events).

Figure 2D:
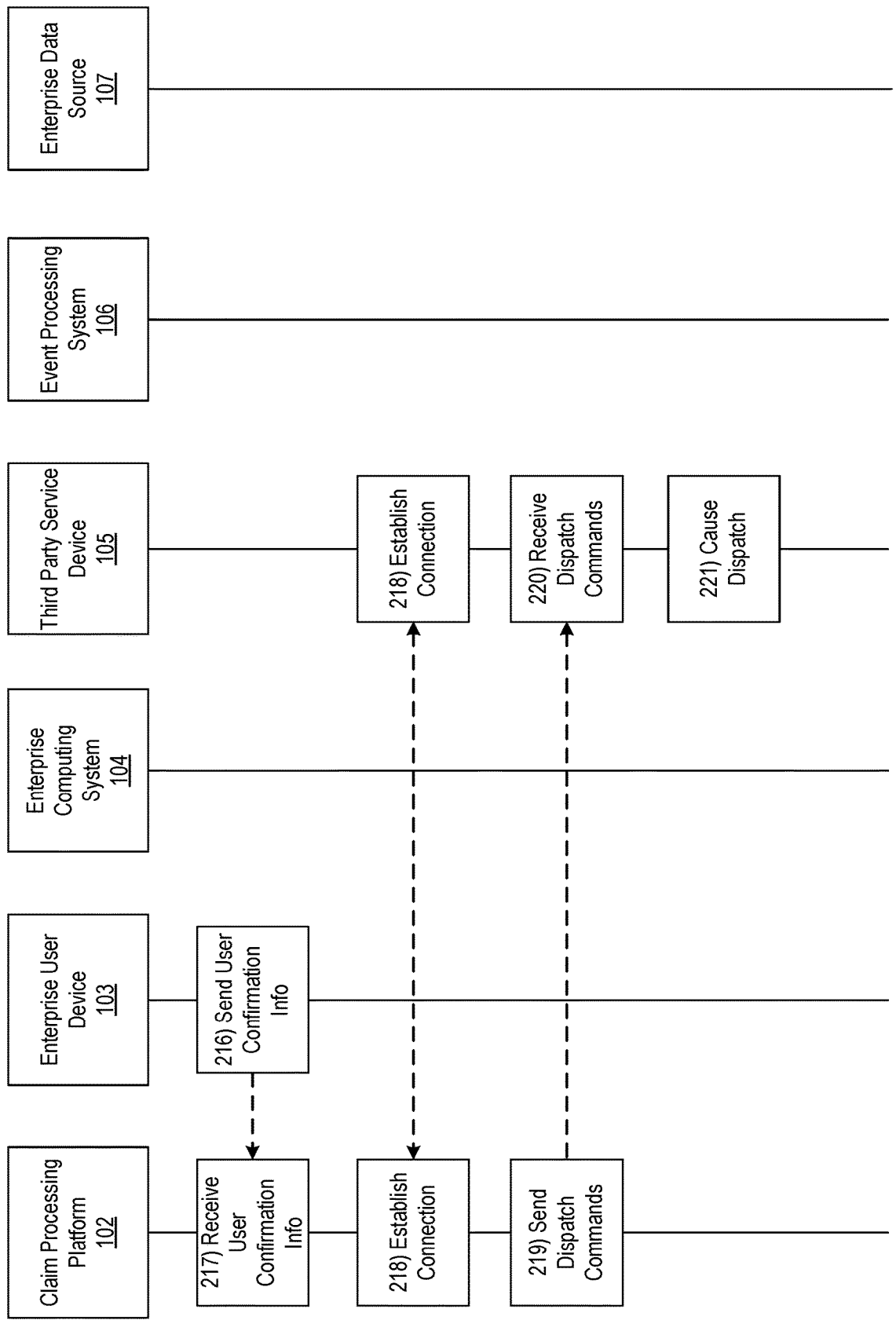

Referring to FIG. 2D, at step 216, the enterprise user device 103 may send the user confirmation information, received at step 215, to the claim processing platform 102. For example, the enterprise user device 103 may send the user confirmation information to the claim processing platform 102 while the second wireless data connection is established.

At step 217, the claim processing platform 102 may receive the user confirmation information sent at step 216. For example, the claim processing platform 102 may receive the user confirmation information via the communication interface 113 and while the second wireless data connection is established.

At step 218, the claim processing platform 102 may establish a connection with the third party service device 105. For example, the claim processing platform 102 may establish a fifth wireless data connection to link the claim processing platform 102 to the third party service device 105 (e.g., in preparation for sending one or more dispatch commands). In some instances, the claim processing platform 102 may identify whether or not a connection is already established with the third party service device 105. If a connection is already established with the third party service device 105, the claim processing platform 102 might not re-establish the connection. If a connection is not yet established with the third party service device 105, the claim processing platform 102 may establish the fifth wireless data connection as described herein.

At step 219, based on receiving user confirmation information indicating that a service vehicle should be dispatched, the claim processing platform 102 may send one or more commands directing the third party service device 105 to dispatch a service vehicle (e.g., via the communication interface 113 and while the fifth wireless data connection is established). At step 220, the third party service device 105 may receive the one or more commands directing the third party service device 105 to dispatch the service vehicle (e.g., while the fifth wireless data connection is established).

At step 221, based on or in response to the one or more commands directing the third party service device 105 to dispatch the service vehicle, the third party service device 105 may dispatch the service vehicle. For example, the third party service device 105 may cause dispatch (e.g., automatically, notify a user to cause the dispatch, or the like) of a tow vehicle, repair vehicle, and/or other service vehicle to a location indicated in the claim information.

In some instances, the third party service device 105 may be affiliated with another third party service such as a law firm, a transportation service, a medical service, and/or other service, and rather than dispatching a tow vehicle, the claim processing platform 102 may cause communication to be established between the third party service device 105 and the user computing device 104.

Figure 2E:
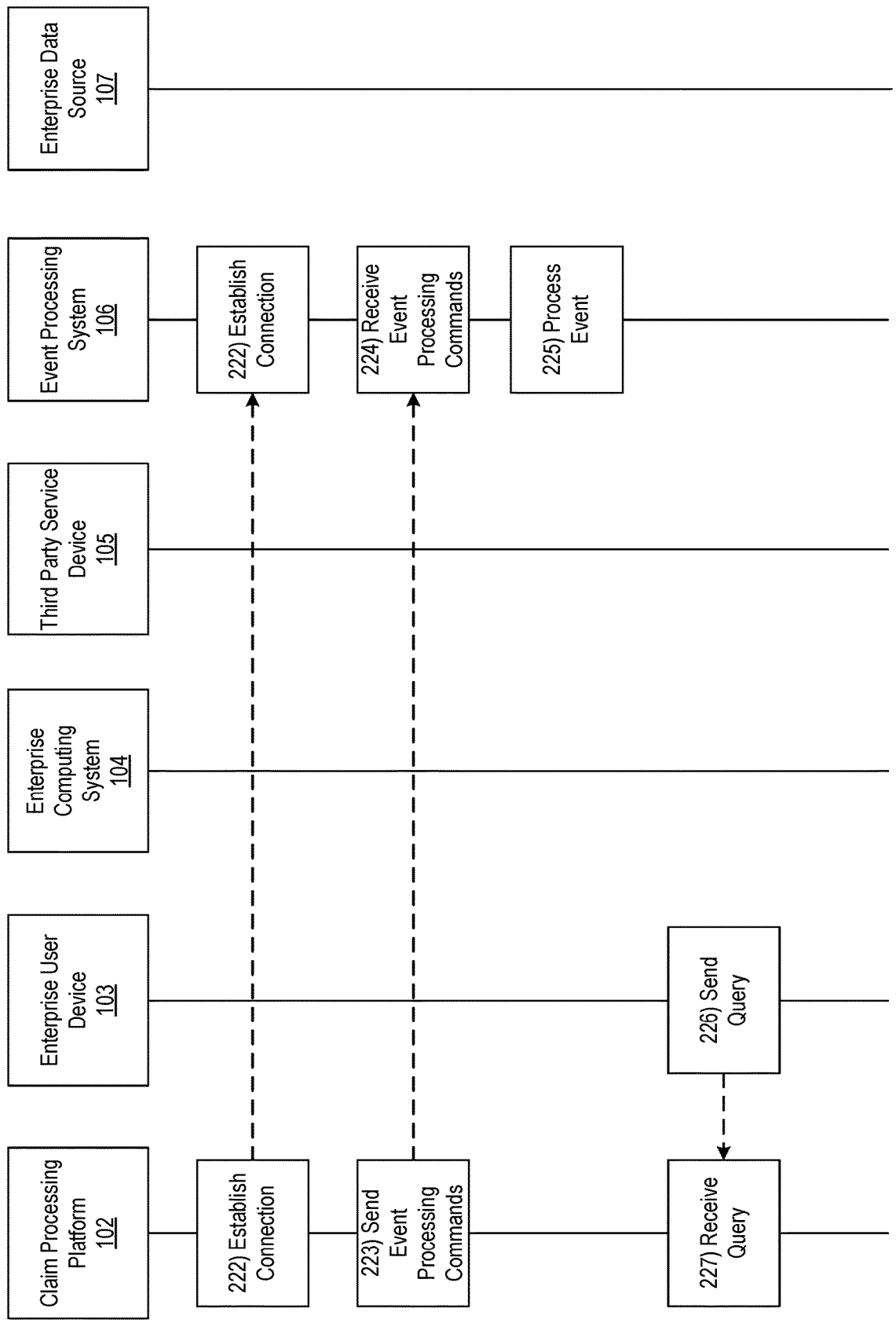

Referring to FIG. 2E, at step 222, the claim processing platform 102 may establish a connection with the event processing system 106. For example, the claim processing platform 102 may establish a sixth wireless data connection with the event processing system 106 to link the claim processing platform 102 to the event processing system 106 (e.g., in preparation for sending event processing commands). In some instances, the claim processing platform 102 may identify whether or not a connection is already established with the event processing system 106. If a connection is already established with the event processing system 106, the claim processing platform 102 might not re-establish the connection. If a connection is not yet established with the event processing system 106, the claim processing platform may establish the sixth wireless data connection as described herein.

At step 223, based on receiving user confirmation information indicating that an event should be processed, the claim processing platform 102 may send (e.g., via the communication interface 113 and while the sixth wireless data connection is established) one or more event processing commands directing the event processing system 106 to process an event (e.g., cause a fund transfer, execute a payment, and/or otherwise process an event). At step 224, the event processing system 106 may receive the one or more event processing commands sent at step 223 (e.g., while the sixth wireless data connection is established).

At step 225, based on or in response to the one or more event processing commands, the event processing system 105 may process an event (e.g., execute a payment, fund transfer, and/or other financial event based on the claim). Once processing of the claim is complete, the claim processing platform 102 may close the claim.

At step 226, the enterprise user device 103 may send a query to the claim processing platform 102. For example, the enterprise user device 103 may send a query to the claim processing platform 102 requesting one or more shared economy insights (e.g., damage estimation, fault determination, request for service, and/or other shared economy insights from an employee/contractor associated with a shared economy enterprise) and/or one or more commercial insights (similar to the shared economy insights, but not associated with a shared economy enterprise). In some instances, the enterprise user device 103 may send the query without requesting a claim to be initiated or otherwise processed. For example, the enterprise user device 103 may send a query requesting insight from one or more sub-systems/processes within an end-to-end claim processing service, without initiating a claim, and without engaging the end-to-end claim processing service in its entirety. In some instances, the enterprise user device 103 may send the query to the claim processing platform 102 while the second wireless data connection is established. In other instances, the enterprise user device 103 may send the query to the claim processing platform 102 via the enterprise computing system 104 (e.g., an employee may contact the enterprise organization, and the organization may generate or otherwise route a query on his or her behalf).

At step 227, the claim processing platform 102 may receive the query sent at step 226. For example, the claim processing platform 102 may receive the query via the communication interface 113 and while the second wireless data connection is established. For example, the computing platform may receive a request to identify whether a rideshare driver's vehicle is a total loss (e.g., from a corporate employee and/or driver of a rideshare company, or the like), a request to identify an estimated repair cost for damage to a rental home (e.g., from a corporate employee of a home share company, an owner of the rental home, or the like), and/or other query pertaining to a shared economy or commercial context. In some instances, in receiving the request, the claim processing platform 102 may receive images, video, or the like indicating damage.

Figure 2F:
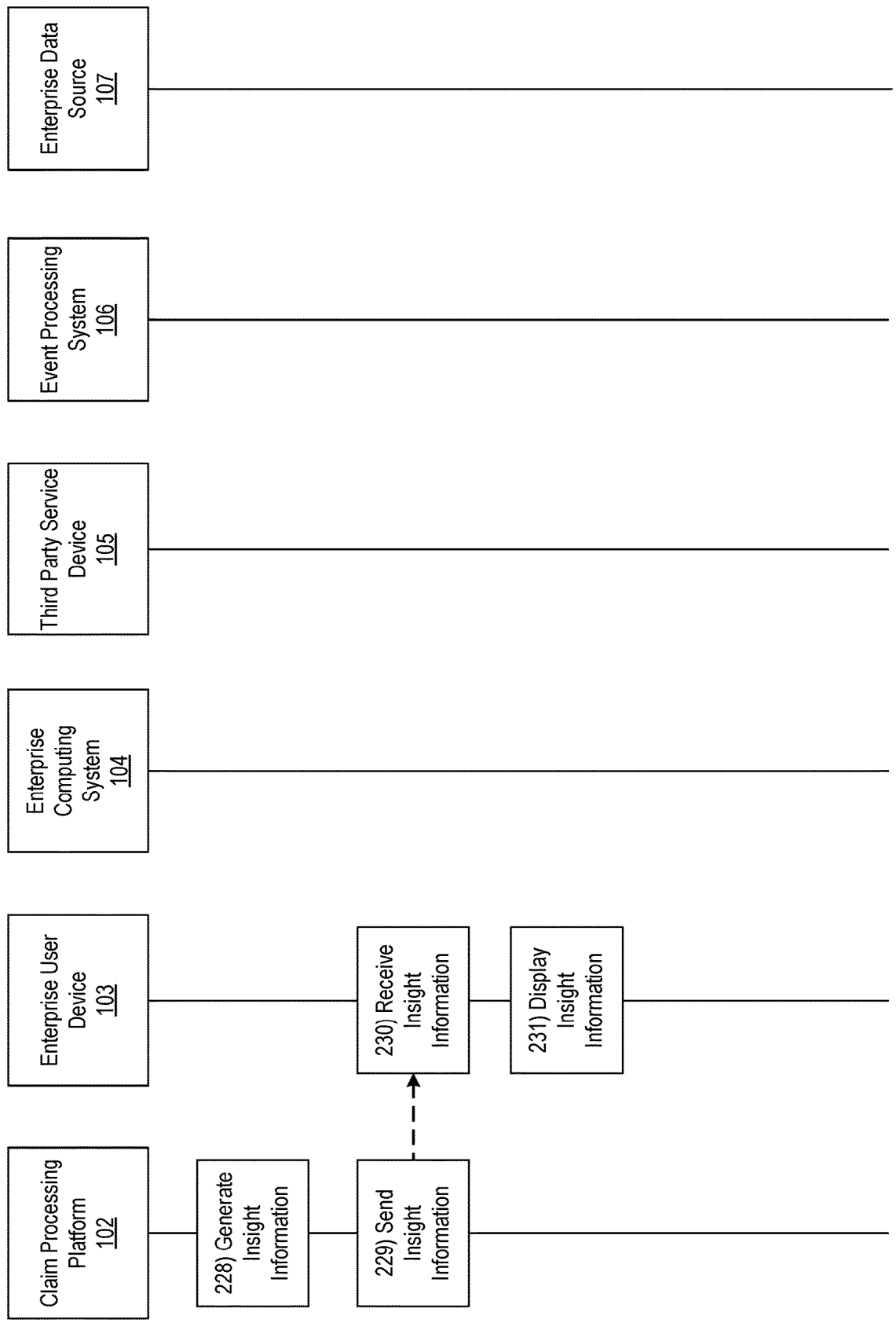

With reference to FIG. 2F, at step 228, the claim processing platform 102 may leverage one or more sub-processes of the machine learning model to generate insight information. For example, in training the machine learning model, the claim processing platform 102 may have trained one or more sub models that may be used for claim processing (e.g., fault determination, damage determination, injury determination, and/or other sub-models/processes). As described herein, although the claim processing platform 102 may leverage these sub-processes/models to process a claim through an end to end claim processing process (e.g., as described above), the claim processing platform 102 may leverage any and/or all of these sub-processes/models individually (e.g., without engaging the entire end to end claim processing process) to respond to a query (e.g., an individual may simply ask a question, without filing a claim). In some instances, the machine learning model may be trained to identify one or more sub-models to apply based on the query received, and to apply these one or more sub-models accordingly. For example, the machine learning model may identify that a query is requesting a damage assessment, and so it may apply a damage assessment sub-model/process.

More specifically, the claim processing platform 102 may identify, without initiating an end-to-end claim processing process and based on the query (e.g., shared economy query, commercial query, and/or other query), one or more sub-processes (e.g., within the machine learning mode) within the end-to-end claim processing process to execute. For example, the claim processing platform 102 may identify that a vehicle diagnostic process (e.g., ordinarily applied in claim processing as part of the machine learning mode) should be applied to evaluate whether or not the vehicle is a total loss, an estimated repair cost, or the like (e.g., without applying an entire claim processing process). As another example, the claim processing platform 102 may identify that a home damage diagnostic process should be applied to evaluate an estimated repair cost, or the like (e.g., without applying an entire claim processing process). After identifying a sub-process that should be applied, the claim processing platform 102 may execute one of the identified sub-processes within the end-to-end claim processing process, wherein the execution results in one or more values or insights. For example, the claim processing platform 102 may determine whether the vehicle is a total loss, an estimated home/vehicle repair cost, or the like. In some instances, these determinations may be made, based in part, on information received from a third party (e.g., repair shop, maintenance facility, or the like). The claim processing platform 102 may continue to apply identified sub-processes until all identified sub-processes have been applied (e.g., the claim processing platform 102 may identify that the vehicle is a total loss, and then may identify an estimated repair cost). In applying the identified sub-processes, the claim processing platform 102 may generate insight information that indicates a response to the query.

As additional examples of the identified sub-processes, the claim processing platform 102 may execute any of the above described processes related to set claim preferences, pick up new claim, complete file orientation, determine file needs, create claim plan, complete initial claim activity, reassignment, coverage confirmation, fault determination, injury evaluation, physical damage value determination, outcome communication, gather loss detail, gather injury damage detail, gather physical damage detail, evaluate injury/physical damage, settlement assembly, settlement communication, gather additional information, payment issued, and/or other claim processing stages.

At step 229, the claim processing platform 102 may send the insight information and one or more commands directing the enterprise user device 103 to display the insight information (e.g., via the communication interface 113 and while the second wireless data connection is established). At step 230, the enterprise user device 103 may receive the insight information and one or more commands directing the enterprise user device 103 to display the insight information (e.g., while the second wireless data connection is established).

At step 231, based on or in response to the one or more commands directing the enterprise user device 103 to display the insight information, the enterprise user device 103 may display the insight information. For example, the enterprise user device 103 may display a graphical user interface similar to graphical user interface 505, which is shown in FIG. 5. For example, the enterprise user device 103 may display a damage estimation, along with an option to initiate a claim.

More specifically, in displaying the insight information, the enterprise user device 103 may display information that may be used to inform a decision related to the query (e.g., shared economy or commercial query). For example, the enterprise user device 103 may display an indication of total loss, estimated repair cost, or the like, and this information may be used to perform a cost benefit analysis with regard to shared economy services (e.g., whether it is more profitable to wait and let the driver fix their vehicle on their own or to pay for the driver to purchase a new vehicle and begin driving quicker to make money for the ridesharing company, whether it is more profitable to pay for a home repair so that a home can be rented quicker or to wait and let the home owner repair the damage independently which may delay the repair, or the like) and/or commercial services. In some instances, the claim processing platform 102 may perform this cost benefit analysis automatically (e.g., using machine learning algorithms, models, or the like), and return a decision to the enterprise user device 103. In some instances, the enterprise user device 103 may be operated by an employee of an enterprise organization and/or a shared economy employee/contractor.

For illustrative purposes, as a specific example of the shared economy insight generation described above at steps 226-231, the claim processing platform 102 may receive a request from a corporate employee of a rideshare company (e.g., via enterprise user device 103, or the like) to identify whether a particular rideshare driver's (e.g., an employee, independent contractor, or the like corresponding to the rideshare company) vehicle is a total loss. In some instances, in receiving the request, the claim processing platform 102 may receive images, video, or the like that includes damage to the vehicle. In some instances, the request may be received from the driver (e.g., via first enterprise user device 103). In these instances, the claim processing platform 102 may identify whether or not the vehicle is a total loss, and may provide an indication of whether or not the vehicle is a total loss to the corporate employee, which may, e.g., allow the employee to perform a cost benefit analysis to determine whether it is more profitable to wait and let the driver fix his or her vehicle independently, or to pay for the driver to get a new vehicle so that he or she may begin driving quicker and make money for the rideshare company. In some instances, the claim processing platform 102 may perform this cost benefit analysis (e.g., using one or more machine learning algorithms or the like).

As another example, the claim processing platform 102 may receive, from an employee of a home share company (e.g., via enterprise user device 103) or a homeowner affiliated with the home share company (e.g., via enterprise user device 103), a request to identify an estimated repair cost for damage in a particular home that is typically rented through the home share company (e.g., damage that may be preventing the home from being rented). In this example, the claim processing platform 102 may identify an estimated cost of repair based on images/video of the damage, a geographical region in which the home is located, or the like. The claim processing platform 102 may then provide the estimated cost to the employee of the home share company, which may allow the employee to perform a cost benefit analysis to determine whether it is more profitable to simply pay for the repair so the home can be rented quicker, or to wait and let the homeowner repair the damage on their own (which may, e.g., delay the repair). In some instances, the claim processing platform 102 may perform this cost benefit analysis (e.g., using machine learning algorithms or the like).

In some instances, the claim processing platform 102 may host a portal that enables individuals to input information that enables the above described claim processing (e.g., the end to end process) and/or query responses (e.g., leveraging sub-processes of the end to end process without the need to file a claim or apply the end to end process in its entirety.

Similar methods may be performed with regard to commercial use cases without departing from the scope of the disclosure.

Figure 3:
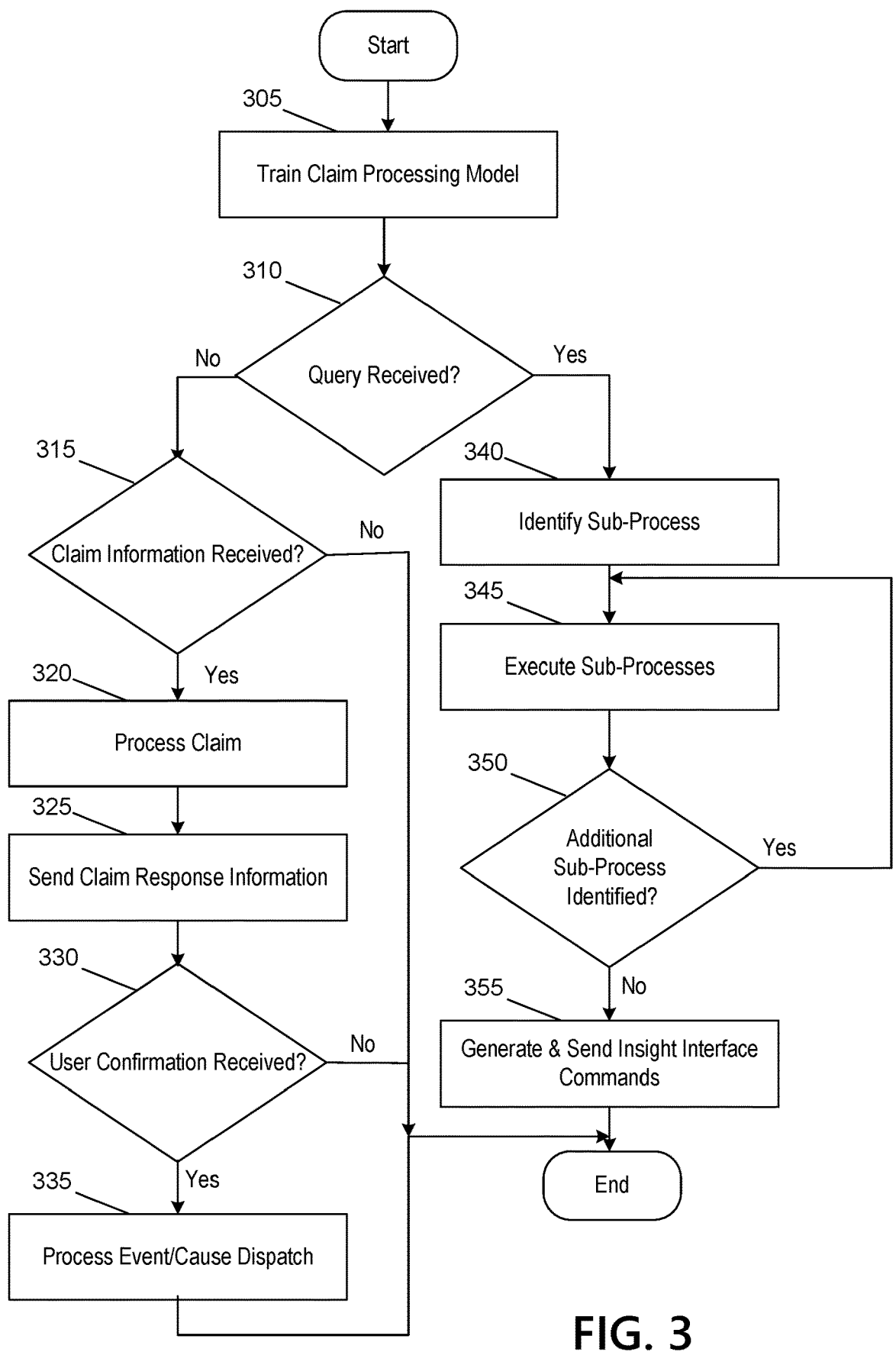
FIG. 3 depicts an illustrative method for applying machine learning for claim processing and/or insight generation in accordance with one or more example embodiments.

FIG. 3 depicts an illustrative method for claim processing and/or insight generation in accordance with one or more example embodiments. Referring to FIG. 3, at step 305, a computing platform having at least one processor, a communication interface, and a memory may train a claim processing model to process claims and/or provide query insights. At step 310, the computing platform may identify whether or not a query was received. If a query was not received, the computing platform may proceed to step 315.

At step 315, the computing platform may identify whether or not claim information was received. If claim information was not received, the method may end. If claim information was received, the computing platform may proceed to step 320. At step 320, the computing platform may process the claim using the machine learning model. At step 325, the computing platform may send claim response information to a user computing device. At step 330, the computing platform may identify whether user confirmation information was received. If user confirmation information was not received, the method may end. If user confirmation information was received, the computing platform may proceed to step 335. At step 335, the computing platform may cause an event to be processed and/or a service vehicle to be dispatched.

Returning to step 310, if a query was received, the computing platform may proceed to step 340. At step 340, the computing platform may identify one or more sub-processes to apply to identify a query response. At step 345, the computing platform may execute the one or more identified sub-processes. At step 350, the computing platform may determine whether an additional sub-process has been identified that should be executed. If so, the computing platform may return to step 345. If not, the computing platform may proceed to step 355. At step 355, the computing platform may generate and send one or more commands directing the user computing device to display an insight interface based on results of the executed one or more sub-processes.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   train a machine learning model comprising a plurality of sub-models by using historical claim processing information, wherein training the machine learning model comprises:
   receiving an input comprising one of a query or a new claim, wherein if the input is the query:
   train the machine learning model to identify a first one or more sub-models of the plurality of sub-models as being associated with the query;
   generate, using the first one or more sub-models, insight information in response to the query; and
   send, to a user computing device, the insight information and one or more commands directing the user computing device to display the insight information, wherein sending the one or more commands causes the user computing device to display the insight information; or if the input is the new claim:
  train the machine learning model to identify a second one or more sub-models of the plurality of sub-models as being associated with the new claim;
  process, using the second one or more sub-models the new claim, wherein processing the new claim comprises:
    comparing, using the second one or more sub-models, new claim information and the stored historical claim processing information;
    generating, using the second one or more sub-models, a plurality of decisions in response to the comparison of the new claim information and the stored historical claim processing information;
    generating, using the second one or more sub-models, new claim processing information comprising a recommendation based on the plurality of decisions;
    generating a match score based on a comparison of the new claim processing information to the historical claim processing information
    comparing the match score to a predetermined confidence threshold; and
    based on identifying that the match score exceeds the predetermined confidence threshold, sending, to the user computing device, the new claim processing information and one or more commands directing the user computing device to display the new claim processing information, wherein sending the one or more commands causes the user computing device to display the new claim processing information.

2. The computing platform of claim 1, wherein the historical claim processing information includes one or more of: one or more images, one or more videos, damage assessment information, fault information, settlement amounts, or telematics data.

3. The computing platform of claim 1, wherein the memory stores additional computer-readable instructions that, when executed by the at least one processor, further cause the computing platform to:
  based on identifying that the new claim processing information does not exceed the predetermined confidence threshold, designate the new claim processing information for manual review.

4. The computing platform of claim 1, wherein the memory stores additional computer-readable instructions that, when executed by the at least one processor, further cause the computing platform to:
  generate, while processing the new claim, claim status information indicating a status of processing the new claim;
  receive a request for a status update for processing of the new claim; and
  send, in response to the request for the status update, the claim status information, wherein sending the claim status information causes the claim status information to be displayed at a remote computing device.

5. The computing platform of claim 1, wherein the memory stores additional computer-readable instructions that, when executed by the at least one processor, further cause the computing platform to:
  receive, from the user computing device, confirmation information; and
  in response to receiving the confirmation information, perform one or more of:
    sending one or more commands comprising instructions for an event processing system to execute a payment corresponding to the new claim, or
    sending one or more commands comprising instructions for a third party service device to cause dispatch of a service vehicle based on the claim information.

6. The computing platform of claim 1, wherein the plurality of decisions comprises a damage assessment, a fault assessment, and an injury assessment.

7. The computing platform of claim 1, wherein the query is a request for one of: a damage assessment, a fault assessment, or an injury assessment.

8. The computing platform of claim 1, wherein the comparison of the new claim processing information to the historical claim processing information is based on at least one of a damage type, vehicle type, and a geographic region.

9. The computing platform of claim 1, wherein training the machine learning model further comprises:
  determining the new claim information is insufficient to process the new claim; and
  in response to determining the new claim information is insufficient:
    requesting additional claim information from the user computing device; or
    contacting an insurance adjuster.

10. A method comprising:
  at a computing platform comprising at least one processor, a communication interface, and memory:
    training a machine learning model comprising a plurality of sub-models by using historical claim processing information, wherein training the machine learning model comprises:
      receiving an input comprising one of a query or a new claim, wherein if the input is the query;
        training the machine learning model to identify a first one or more sub-models of the plurality of sub-models as being associated with the query;
        generating, using the first one or more sub-models, insight information in response to the query; and
        sending, to a user computing device, the insight information and one or more commands directing the user computing device to display the insight information, wherein sending the one or more commands causes the user computing device to display the insight information; or
      if the input is the new claim:
        training the machine learning model to identify a second one or more sub-models of the plurality of sub-models as being associated with the new claim:
        generating, using the second one or more sub-models, new claim processing information comprising a recommendation;
        generating, while processing the new claim, claim status information indicating a status of processing the new claim;
        receiving a request for a status update for processing of the new claim;

sending, in response to the request for the status update, the claim status information, wherein sending the claim status information causes the claim status information to be displayed at a remote computing device;

generating a match score based on a comparison of the new claim processing information to the historical claim processing information;

comparing the match score to a predetermined confidence threshold; and based on identifying that the match score exceeds the predetermined confidence threshold, sending, once the claim has been processed and to the user computing device, the new claim processing information and one or more commands directing the user computing device to display the new claim processing information, wherein sending the one or more commands causes the user computing device to display the new claim processing information.

11. The method of claim 10, wherein the historical claim processing information includes one or more of: one or more images, one or more videos, damage assessment information, fault information, settlement amounts, or telematics data.

12. The method of claim 10, further comprising:
based on identifying that the new claim processing information does not exceed the predetermined confidence threshold, designating the new claim processing information for manual review.

13. The method of claim 10, further comprising:
receiving, from the user computing device, confirmation information; and in response to receiving the confirmation information, performing one or more of:
sending one or more commands comprising instructions for an event processing system to execute a payment corresponding to the new claim, or sending one or more commands comprising instructions for a third party service device to cause dispatch of a service vehicle based on the claim information.

14. The method of claim 10, wherein the query is a request for one of: a damage assessment, a fault assessment, or an injury assessment.

15. The method of claim 10, wherein the comparison of the new claim processing information to the historical claim processing information is based on at least one of a damage type, vehicle type, and a geographic region.

16. One or more non-transitory computer-readable media storing instructions that, when executed by a computing platform comprising at least one processor, a communication interface, and memory, cause the computing platform to:

train a machine learning model comprising a plurality of sub-models by using historical claim processing information, wherein training the machine learning model comprises;

receiving, prior to receiving a new claim, new claim information and a query from a user computing device;

identifying a response to the query, wherein identifying the response to the query comprises:
identifying a first sub-model of the plurality of sub-models as being associated with the query, parsing the new claim information for claim data associated with the first sub-model, and generating, using the first sub-model, a response to the query;

sending, to the user computing device, the response to the query, wherein sending the response to the query causes the user computing device to display the response to the query; and in response to receiving, from the user computing device, a decision regarding submitting the new claim, processing, the new claim, wherein processing the new claim comprises:

comparing, using a second sub-model, the new claim information and the stored historical claim processing information;

generating, using the second sub-model, a plurality of decisions in response to the comparison of the claim information and the stored historical claim processing information each of the plurality of sets of new claim data, and generating, using the second sub-model, new claim processing information comprising a recommendation based on the plurality of decisions;

generating a match score based on a comparison of the new claim processing information to the historical claim processing information;

comparing the match score to a predetermined confidence threshold; and based on identifying that the match score exceeds the predetermined confidence threshold, sending, to the user computing device, the new claim processing information and one or more commands directing the user computing device to display the new claim processing information, wherein sending the one or more commands causes the user computing device to display the new claim processing information.

17. The one or more non-transitory computer-readable media of claim 16, wherein the memory stores additional computer-readable instructions that, when executed by the at least one processor, further cause the computing platform to:

generate, while processing the new claim, claim status information indicating a status of processing the new claim;

receive a request for a status update for processing of the new claim; and send, in response to the request for the status update, the claim status information, wherein sending the claim status information causes the claim status information to be displayed at a remote computing device.

18. The one or more non-transitory computer-readable media of claim 16, wherein the plurality of decisions comprises a damage assessment, a fault assessment, and an injury assessment.

19. The one or more non-transitory computer-readable media of claim 16, wherein the query is a request for one of: a damage assessment, a fault assessment, or an injury assessment.

20. The one or more non-transitory computer-readable media of claim 16, wherein the comparison of the new claim processing information to the historical claim processing information is based on at least one of a damage type, vehicle type, and a geographic region.

* * * * *